Patented May 15, 1928.

1,669,764

UNITED STATES PATENT OFFICE.

OSCAR KNECHT, OF BINNINGEN, NEAR BASEL, SWITZERLAND, ASSIGNOR TO CHEMICAL WORKS FORMERLY SANDOZ, OF BASEL, SWITZERLAND, A FIRM.

2-AMINO-4-NITROPHENOXYETHANOL AND PROCESS OF PRODUCING THE SAME.

No Drawing. Application filed December 13, 1926, Serial No. 154,652, and in Germany December 19, 1925.

2.4-dinitrophenoxyethanol is contrarily to the 2.4-dinitrophenolalkylethers, easily hydrolized by alkaline agents, as for instance by dilute caustic soda. This splitting off of the glycol radical, which happens very easily, is the reason why the preparation of this compound, after known prescriptions, could hitherto only be performed in an imperfect manner. It was, therefore, not to be foreseen it would be possible to transform the 2.4-dinitrophenoxyethanol into the hitherto unknown nitroaminocompound by means of alkaline reducing agents.

It has now been found that this is possible and almost without saponification, if for instance 2.4-dinitrophenoxyethanol is treated with alkali sulphides or alkali polysulphides at warm temperature. By an easy reaction and without by-products, 2-amino-4-nitrophenoxyethanol is formed, which is more difficultly saponifiable than the dinitrocompound. This derivative of m-nitraniline, which so far has never been prepared, may be used as intermediate product for the preparation of valuable dyestuffs.

The following example illustrates the process of making such product:

To an aqueous suspension of 177 kg. of 2.4-dinitrophenoxyethanol an aqueous solution of sodium tetrasulphide, prepared from 240 kg. of sodium sulphide and 96 kg. of sulphur, is added, under vigorous stirring at about 60° C., whereby an immediate reduction takes place under self heating. The mixture is kept a short time at a temperature of 60° C., then cooled down to 20° C. After neutralization with 25 kg. of hydrochloric acid the nitroaminocompound is precipitated as an orange colored deposit containing sulphur. The nitroaminocompound is then dissolved in 500 litres of water and 80 kg. of hydrochloric acid, the sulphur remaining undissolved. The hydrochloride solution can be used as such, or the base can be precipitated with soda. In the latter case the base separates as a brown oil, which solidifies by stirring to a golden-yellow crystalline deposit. The hitherto unknown 2-amino-4-nitrophenoxyethanol melts at 111–112° C. and is easily soluble in alcohol and very difficultly soluble in benzene.

The hitherto unknown 2.4-dinitrophenoxyethanol is easily formed by heating 2.4-dinitro-1-chlorobenzene with glycol and soda for some hours at a temperature of 90–100° C. The reaction product is then recrystallized from water, whereby yellowish crystal needles are obtained, melting at 111–112° C.

The working conditions are not limited to those of the above example, but may be varied to a large extent. For instance, the dinitrocompound may be added to the reducing agent or the reaction may be performed in an aqueous alcoholic or a pure alcoholic solution. Further the reduction can also take place at other temperatures and with other polysulphides and other quantities of these agents.

What I claim is:

1. A process for the preparation of 2-amino-4-nitrophenoxyethanol, consisting in treating 2.4-dinitrophenoxyethanol with an alkali sulphide as reducing agent.

2. A process for the preparation of 2-amino-4-nitrophenoxyethanol consisting in treating 2.4-dinitrophenoxyethanol with an alkali polysulphide as reducing agent.

3. The herein described 2-amino-4-nitrophenoxyethanol obtained by the treatment of 2.4-dinitrophenoxyethanol with an alkali sulphide and constituting an intermediate product for dyestuffs in form of yellow crystals easily soluble in alcohol and very difficultly soluble in benzene, dissolving easily in dilute mineral acids to quantitatively diazotizable solutions.

In witness whereof I have hereunto signed my name this 26th day of November 1926.

OSCAR KNECHT.